United States Patent
Boulton et al.

(10) Patent No.: US 10,237,531 B2
(45) Date of Patent: Mar. 19, 2019

(54) DISCONTINUITY-AWARE REPROJECTION

(71) Applicant: MICROSOFT TECHNOLOGY LICENSING, LLC, Redmond, WA (US)

(72) Inventors: Michael George Boulton, Seattle, WA (US); Ashraf Ayman Michail, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 55 days.

(21) Appl. No.: 15/407,858

(22) Filed: Jan. 17, 2017

(65) Prior Publication Data

US 2017/0374344 A1     Dec. 28, 2017

Related U.S. Application Data

(63) Continuation-in-part of application No. 15/190,085, filed on Jun. 22, 2016.

(51) Int. Cl.
*H04N 13/128* (2018.01)
*G06T 7/70* (2017.01)
(Continued)

(52) U.S. Cl.
CPC ......... *H04N 13/128* (2018.05); *G02B 27/017* (2013.01); *G06T 7/70* (2017.01);
(Continued)

(58) Field of Classification Search
CPC .................................................. H04N 13/128
See application file for complete search history.

(56) References Cited

U.S. PATENT DOCUMENTS 3,778,130 A     12/1973  Waters
5,917,937 A      6/1999  Szeliski et al.
(Continued)

FOREIGN PATENT DOCUMENTS

CN       102496183 A     6/2012
EP         3051525 A1     8/2016
WO    2017087088 A1     5/2017

OTHER PUBLICATIONS

Manessis, et al., "Reconstruction of scene models from sparse 3D structure", In Proceedings of IEEE Conference on Computer Vision and Pattern Recognition, Jun. 15, 2000, 6 pages.
(Continued)

*Primary Examiner* — James M Pontius
(74) *Attorney, Agent, or Firm* — Alleman Hall Creasman & Tuttle LLP

(57) ABSTRACT

In various embodiments, methods and systems reprojecting three-dimensional (3D) virtual scenes using discontinuity depth late stage reprojection are provided. A reconstruction point, that indicates camera pose information, is accessed. The reconstruction point is associated with a plurality of sample points of a three-dimensional (3D) virtual scene. One or more closest sample points, relative to the reconstruction point, are identified, from the plurality of sample points. Each of the one or more closest sample points is associated with a cube map of color data and depth data. A relative convergence score is determined for each of the one or more closest sample points based on performing a depth-aware cube map late stage reprojection operation in relation to the reconstruction point. A subset of the one or more closest sample points is identified based on the relative convergence score. A reconstructed 3D virtual image is generated using the subset.

20 Claims, 11 Drawing Sheets

(51) Int. Cl.
*G02B 27/01* (2006.01)
*H04N 13/111* (2018.01)
*H04N 13/15* (2018.01)
*H04N 13/324* (2018.01)
*H04N 13/344* (2018.01)
*H04N 13/366* (2018.01)
*H04N 13/398* (2018.01)
*G06T 15/06* (2011.01)
*G06T 19/00* (2011.01)

(52) U.S. Cl.
CPC .............. *G06T 15/06* (2013.01); *G06T 19/00* (2013.01); *H04N 13/111* (2018.05); *H04N 13/15* (2018.05); *H04N 13/324* (2018.05); *H04N 13/344* (2018.05); *H04N 13/366* (2018.05); *H04N 13/398* (2018.05); *G02B 2027/014* (2013.01); *G02B 2027/0134* (2013.01); *G06T 2207/10021* (2013.01); *G06T 2207/30244* (2013.01)

(56) References Cited

U.S. PATENT DOCUMENTS

| | | | |
|---|---|---|---|
| 5,933,125 | A | 8/1999 | Fernie et al. |
| 6,205,241 | B1 | 3/2001 | Melen |
| 6,476,803 | B1 | 11/2002 | Zhang et al. |
| 7,312,766 | B1 | 12/2007 | Edwards |
| 7,551,770 | B2 | 6/2009 | Harman |
| 7,720,277 | B2 | 5/2010 | Hattori |
| 8,711,206 | B2 | 4/2014 | Newcombe et al. |
| 8,929,645 | B2 | 1/2015 | Coffman |
| 9,083,960 | B2 | 7/2015 | Wagner et al. |
| 9,251,590 | B2 | 2/2016 | Sharp et al. |
| 9,256,926 | B2 | 2/2016 | Berretty et al. |
| 9,277,122 | B1 | 3/2016 | Imura et al. |
| 9,369,689 | B1 | 6/2016 | Tran et al. |
| 9,443,355 | B2 | 9/2016 | Chan et al. |
| 2003/0001838 | A1* | 1/2003 | Han .................. G06T 15/04 345/419 |
| 2010/0156901 | A1 | 6/2010 | Park et al. |
| 2012/0069205 | A1 | 3/2012 | Dowski et al. |
| 2012/0155750 | A1 | 6/2012 | Kim et al. |
| 2012/0195471 | A1 | 8/2012 | Newcombe et al. |
| 2013/0278631 | A1 | 10/2013 | Border et al. |
| 2013/0343610 | A1 | 12/2013 | Dal mutto et al. |
| 2014/0176591 | A1 | 6/2014 | Klein et al. |
| 2014/0285690 | A1 | 9/2014 | Benedetti et al. |
| 2014/0363100 | A1 | 12/2014 | Usikov |
| 2015/0002542 | A1 | 1/2015 | Chan et al. |
| 2015/0029218 | A1 | 1/2015 | Williams et al. |
| 2015/0170418 | A1 | 6/2015 | Flynn et al. |
| 2015/0277121 | A1 | 10/2015 | Fridental |
| 2015/0332464 | A1* | 11/2015 | O'Keefe .............. H04N 13/246 348/47 |
| 2015/0363976 | A1 | 12/2015 | Henson |
| 2015/0379772 | A1 | 12/2015 | Hoffman |
| 2017/0024900 | A1 | 1/2017 | Geiger |
| 2017/0374341 | A1 | 12/2017 | Michail et al. |
| 2017/0374343 | A1 | 12/2017 | Boulton et al. |
| 2018/0108110 | A1* | 4/2018 | Cuervo .................... G06T 1/60 |
| 2018/0122129 | A1* | 5/2018 | Peterson .............. G06T 15/205 |
| 2018/0144547 | A1* | 5/2018 | Shakib .................. G06T 19/003 |

OTHER PUBLICATIONS

Sedarat, et al., "On the Optimality of the Gridding Reconstruction Algorithm", In Journal of IEEE Transactions on Medical Imaging, vol. 19, Issue 4, Apr. 2000, pp. 306-317.

"Rendering in Directx", Retrieved From https://docs.microsoft.com/en-us/windows/mixed-reality/rendering-in-directx, Aug. 19, 2016, 12 Pages.

"Non-Final Office Action Issued in U.S. Appl. No. 15/190,085", dated Feb. 14, 2018, 9 Pages.

Abrash, Michael, "Down the VR rabbit hole: Fixing judder", Retrieved From http://blogs.valvesoftware.com/abrash/down-the-vr-rabbit-hole-fixing-judder/, Jul. 26, 2013, 70 Pages.

Abrash, Michael, "Why virtual isn't real to your brain: judder", Retrieved From http://blogs.valvesoftware.com/abrash/why-virtual-isnt-real-to-your-brain/, May 15, 2013, 21 Pages.

Benko, et al., "Dyadic Projected Spatial Augmented Reality", In Proceedings of the 27th Annual ACM Symposium on User Interface Software and Technology, Oct. 5, 2014, 11 Pages.

Cheng, et al., "Improved Novel View Synthesis from Depth Image with Large Baseline", In Proceedings of the 19th International Conference on Pattern Recognition, Dec. 8, 2008, 4 Pages.

Chuptys, et al., "Head Mounted Displays", Retrieved From https://pdfs.semanticscholar.org/83b5/d7a6b9846db8ef9a853e2eb41c5f4c32e4ae.pdf, Aug. 19, 2016, 6 Pages.

Daribo, et al., "Bilateral Depth-Discontinuity Filter for Novel View Synthesis", In Proceedings of the IEEE International Workshop on Multimedia Signal Processing, Oct. 4, 2010, pp. 145-149.

Fehn, Christoph., "Depth-image-based Rendering (DIBR), Compression, and Transmission for a New Approach on 3D-TV", In Proceedings of the Stereoscopic Displays and Virtual Reality Systems XI, vol. 5291, May 21, 2004, 12 Pages.

Goradia, et al., "A Review Paper on Oculus Rift & Project Morpheus", In International Journal of Current Engineering and Technology, vol. 4, Issue 5, Oct. 2014, pp. 3196-3200.

Hilliges, et al., "HoloDesk: Direct 3D Interactions with a Situated See-through Display", In Proceedings of the SIGCHI Conference on Human Factors in Computing Systems, May 5, 2012, pp. 2421-2430.

Kim, et al., "Fast Generation of Video Holograms of Three Dimensional Moving Objects using a Motion Compensation Based Novel Look-up Table", In Journal of Optics Express, vol. 21, Issue 9, May 6, 2013, pp. 11568-11584.

Lee, et al., "Discontinuity-adaptive Depth Map Filtering for 3D View Generation", In the Proceedings of the Second International Conference on Immersive Telecommunications, Article No. 8, May 27, 2009, 6 Pages.

"International Search Report and Written Opinion Issued in PCT Application No. PCT/US2017/036927", dated Aug. 29, 2017, 11 Pages.

Pelot, Anthony M., "Dynamic Blanking for Virtual Reality Image Displacement", Retrieved From https://pdfs.semanticscholar.org/0320/956d8657bf02940f323d447f4d8f46896c67.pdf, Aug. 19, 2016, 3 Pages.

Raskar, et al., "iLamps: Geometrically Aware and Self-configuring Projectors", In Proceedings of the ACM Transactions on Graphics, vol. 22, Issue 3, Jul. 2003, 10 Pages.

Raskar, et al., "The Office of the Future: A Unified Approach to Image-Based Modeling and Spatially Immersive Displays", In Proceedings of the 25th Annual Conference on Computer Graphics and Interactive Techniques, Jul. 19, 1998, 10 Pages.

Sajadi, et al., "Auto-Calibrating Projectors for Tiled Displays on Piecewise Smooth Vertically Extruded Surfaces", Retrieved From http://citeseerx.ist.psu.edu/viewdoclkownload?doi=10.1.1.417.9971&rep=rep1&type=pdf, Mar. 28, 2016, 13 Pages.

Tam, et al., "Nonuniform Smoothing of Depth Maps Before Image-based Rendering", In Proceedings of the Three-Dimensional TV, Video, and Display III, vol. 5599, Oct. 25, 2004, 12 Pages.

Xu, et al., "Depth Map Misalignment Correction and Dilation for DIBR View Synthesis", In the Journal of Image Communication, vol. 28, Issue 9, Oct. 1, 2013, pp. 1023-1045.

* cited by examiner

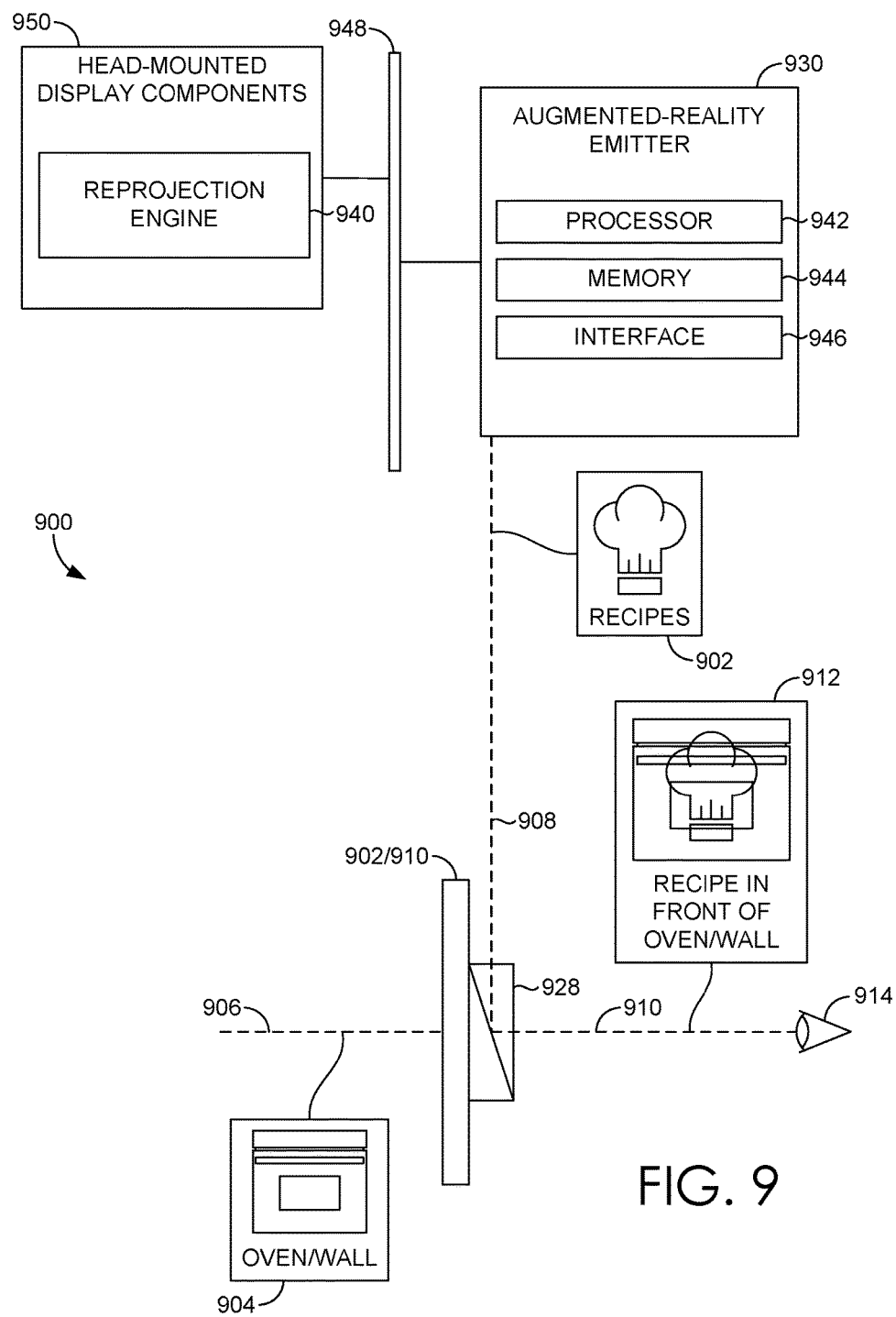

DISCONTINUITY-AWARE REPROJECTION

CROSS-REFERENCE TO RELATED APPLICATIONS

This application is a continuation-in-part of, and claims benefit to, U.S. patent application Ser. No. 15/190,085 filed Jun. 22, 2016, entitled "DEPTH-AWARE REPROJECTION," which is incorporated herein by reference in its entirety.

BACKGROUND

Computing systems can support the manipulation and display of computer images. In particular, a graphical processing unit (or visual processing unit) can be operated as a specialized mechanism for generating images for output to a display. Graphical processing units can support generating images for display on display devices. A display device can specifically support displaying virtual reality images or environments, including augmented reality images or environments. With virtual images, including augmented reality images, additional challenges are involved when generating and communicating virtual images, where the virtual images have to simulate a user's physical via stereoscopic views, while circumventing inherent latencies associated with different types of communications media. As such, a comprehensive system addressing such challenges, associated with rendering virtual images or environments, can improve user experiences with virtual reality.

SUMMARY

Embodiments described herein provide methods and systems for reprojecting three-dimensional (3D) virtual reality scenes based on real-time stereoscopic reprojection. A display system includes a reprojection engine that supports reprojecting images based on an optimized late stage reprojection operation that is performed based on both discontinuity and depth awareness. In this regard, the display system can support discontinuity and depth late stage reprojection (DDLSR). By processing a plurality of rendered sparse sample locations (i.e., sample points in a sample points volume) of a three-dimensional (3D) virtual image (i.e., virtual scene), in conjunction with a depth-aware cube map late stage reprojection operation, the reprojection engine can use one or more sample points to reconstruct a true stereoscopic view of the virtual scene at any arbitrary point within the sample points volume in real time. Advantageously, the reprojection engine can be implemented using commodity hardware (e.g., relatively inexpensive and interchangeable GPUs), where real-time reconstruction and display of complex static virtual reality environments is performed using the commodity hardware. Alternatively, DDSLR may be used as the basis of a sophisticated on-demand stream system, where rendered sparse sample locations are communicated from a high powered machine for display via a display device (e.g., a head mounted display device).

In operation, a reconstruction point, that indicates camera pose information, is accessed. The reconstruction point is associated with a plurality of sample points of a three-dimensional (3D) virtual scene. One or more closest sample points, relative to the reconstruction point, are identified, from the plurality of sample points. Each of the one or more closest sample points is associated with a cube map of color data and depth data. A relative convergence score is determined for each of the one or more closest sample points based on performing a depth-aware cube map late stage reprojection operation, using each of the one or more closest sample points in relation to the reconstruction point. The relative convergence score is based on the capacity of a sample point to reconstruct at least portions of the 3D virtual scene from the reconstruction point. A subset of the one or more closest sample points is identified based on the relative convergence score. A reconstructed 3D virtual image is generated using the subset of the one or more closest sample points.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIG. 9 is a block diagram of an exemplary head-mounted display device, in accordance with embodiments of the present invention.

DETAILED DESCRIPTION

Figure 1:
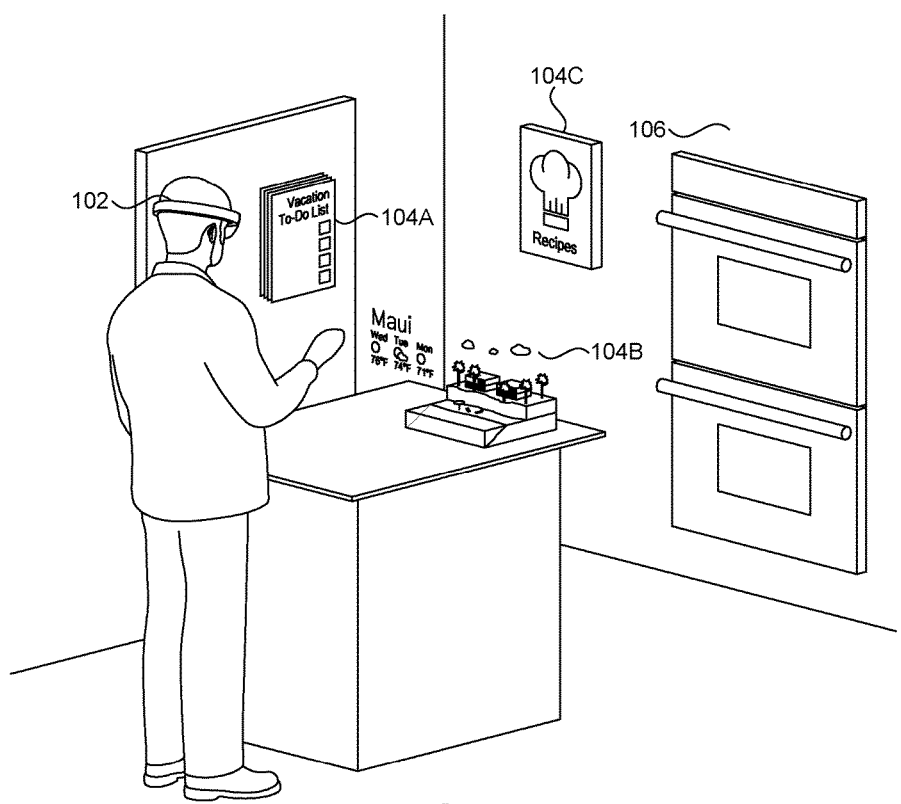
FIG. 1 is an illustrated diagram showing exemplary augmented reality images of a head-mounted display device, in accordance with embodiments of the present invention.

Virtual reality scenes, including virtual reality images and environments, often require significant resources to render detailed content. Conventional methods for rendering virtual scenes can include outsourcing processing of the virtual images to a high-powered machine; the high-powered machine can then communicate rendered images to an HMD. Nonetheless, while attempting to maintain true stereoscopy in the virtual images, challenges arise in communicating and caching the data for the virtual images because of the latency associated with different types of communications media for communicating the virtual scene image data. Image data for representing complete virtual scenes can be significantly sizeable and difficult to transfer between computing systems. Another limitation, in conventional methods for rendering virtual scenes, is the lack of efficient mechanisms for handling dis-occlusion and providing stereoscopic views. Dis-occlusions refer to obscured locations within a virtual scene. Stereoscopy refers to a technique for creating or enhancing the illusion of depth in an image by means of stereopsis for binocular vision. As such, a comprehensive system improving reconstruction of stereoscopic virtual reality and augmented reality views can support better user experiences in virtual environments.

Embodiments of the present invention provide simple and efficient methods and systems for reprojecting three-dimensional (3D) virtual reality scenes based on real-time stereoscopic reprojection. A display system includes a reprojection engine that supports reprojecting images based on an optimized late stage reprojection operation that is performed based on both discontinuity and depth awareness. In this regard, the display system can support discontinuity depth late stage reprojection (DDLSR) that resolves the impact of dis-occlusion in stereoscopic reprojection virtual scenes. By processing a plurality of rendered sparse sample locations (i.e., sample points in a sample points volume) of a three-dimensional (3D) virtual image (i.e., virtual scene), in conjunction with a depth-aware cube map late stage reprojection operation, the reprojection engine can use one or more sample points to reconstruct a true stereoscopic view of the virtual scene at any arbitrary point within the sample points volume in real time.

At a high level, a depth late stage reprojection operation is modified from a frustum to a cube map, where the cube map of one or more sample points of a virtual scene can be used to resolve any dis-occlusions. For example, for a reference point with a dis-occlusion based on a first closest sample point, a second closest sample point can be used to resolve the dis-occlusion of the first closest sample point, where each sample point is associated with a cube map of image data. DDLSR, using the depth-aware cube map late stage projection operation, discussed herein in more detail, supports both determining dis-occlusions based on a divergence (e.g., a zero relative convergence score) and further supports resolving the dis-occlusion using at least one neighbor sample point.

By way of background, virtual reality display technology includes generating and displaying images associated with one or more virtual objects within a virtual reality environment. Advantageously, generating and displaying the images can be at a frame rate that is greater than a rendering frame rate for improving virtual object stability. Late stage reprojection specifically can refer to displaying images based on late stage graphical adjustments of a pre-rendered image (i.e., forward predicted images that are rendered and displayed) in order to incorporate high frequency of pose estimates of a display device (e.g., a head mounted display device (HMD)). The user can be associated with a device and display supporting the rendering and display of the virtual images. For example, the user may be wearing the HMD that supports displaying virtual images in virtual environments including augmented reality environments. Late stage reprojection as employed herein is described in U.S. patent application Ser. No. 13/951,351 entitled "LATE STAGE REPROJECTION," which is incorporated herein by reference in its entirety.

Late stage reprojection (LSR) addresses a basic problem of the impact of head movement of a user when the user is wearing an HMD that supports rendering and displaying virtual reality images (including augmented reality images). The problem results from the change in a pose (i.e., position and orientation) of the HMD during the delay time period between when an image is rendered by the GPU and when the image is communicated for display. Basically, the image is rendered and displayed based on a pose further back in time. The resulting displayed image appears lagging relative to a new pose of the user. Several different LSR techniques exist and most fundamentally operate to receive an updated pose for the HMD, the updated pose is used to re-render the pre-rendered image by adjusting the pre-rendered image.

Depth late stage reprojection (DLSR) is a variation of traditional LSR techniques, where DLSR implements a depth buffer (e.g., a blurred depth map) for better results in that the blurred depth map supports translational corrections to pre-rendered image data prior to display using an iterative processes involving the blurred depth map for the image data. Briefly, a corrected color of each pixel in a frame buffer of stored rendered image data may be determined by a virtual ray cast from the reprojected position of a rendering camera of the display device to a location where the ray intersects the blurred depth map. A pixel at that location in the blurred depth map then may be used to correct the color at the pixel at which the virtual ray intersects the frame buffer. DLSR allows the stabilization of reprojected virtual images at varying depths without the use of a full-resolution depth map, and may be operated using relatively low power consumption and memory bandwidth, making the process suitable for portable devices. Further, as described in more detail below, the disclosed reprojection methods may be configured to converge in a deterministic time per pixel. This may be advantageous in portable devices and/or special-purpose hardware, as no matter the complexity of the original rendered image, the time and power required to reproject the image have fixed upper bounds.

DDLSR addresses the problem of limitations in resolving dis-occlusions for stereoscopic reconstruction of virtual scenes. Stereoscopic reconstruction using DDLSR is based on a volume of sample points in a virtual scene. In particular, sample points can refer to a cube map capture of a point in a virtual scene. A sample point is selected in a virtual scene based on sample point selection scheme. A sample point selection scheme can be hierarchical (i.e., not uniformly located) in that locations within the virtual scene with more content detail include more sample points than locations within the virtual scene with less content detail. For example, a location within the virtual scene with a higher likelihood of dis-occlusions would have more densely selected and placed sample points than a location with a lower likelihood of dis-occlusions. The sample point selection scheme can also place samples within a virtual scene, such that, the samples points can be sparsely located within virtual scene. Advantageously, a distance between any sample point and its closest can be configured to be larger than the intra-ocular distance of the stereoscopic projection. Sample points can be selected at distances that are greater than (e.g., 2 to 3 times greater) the intra-ocular distance of the stereoscopic view (e.g., 64 mm average distance between eyes). Other variations and combinations of sample point selection schemes are contemplated herein.

Sample points include a cube map of both color and depth information. A cube map refers to a computing construct that uses six faces of a cube for environment mapping. In this regard, a virtual scene is projected onto the sides of a cube and stored as six squares or unfolded into six regions. Each sample point represents a DLSR source probe with a cube map of image data (e.g., color and depth) that can be extracted based on the camera pose information (e.g., position and orientation) associated with the user's display device. A sample point identifies a pre-rendered 3D virtual image scene and stores the cube map image data that is used along with one or more additional samples to adjust and reconstruct a portion (i.e., a reconstruction point view) of the virtual scene. A reconstruction point can be identified based on a location of the user (e.g., camera pose information) such that cube maps of corresponding one or more sample points are used to generate a reconstructed stereoscopic view of the virtual scene from the location and viewing angle of the user.

In embodiments, the reconstruction point view reconstruction process can include the identification of dis-occlusions. In particular, dis-occlusions in a stereoscopic reconstruction can be associated with one or both stereoscopic views such that one or more additional sample points are used to resolve the dis-occlusions. A determination, per pixel, of a failure to converge to suitable location during a depth-aware cube map late stage reprojection operation may be made, such that, adjacent sample points are used to attempt to resolve the dis-occlusion. It is contemplated that adjacent sample points can be identified based on different types of heuristics. Advantageously, a closest adjacent sample may be identified for resolving a dis-occlusion; however, in some instances a sample point from an opposite perspective can be a better sample point for resolving the dis-occlusion. Also, it is possible that based on an extent and a location of a dis-occlusion and knowledge of the placement of the sample points, a best available sample point can be identified for resolving the dis-occlusion. Other variations and combinations of heuristics for sample point selection are contemplated with embodiments described herein. As such, the DDLSR implements an algorithm for proficiently identifying dis-occlusions, selecting sample points for resolving dis-occlusions and reconstructing an accurate stereoscopic reprojection at an arbitrary point and orientation (i.e., reconstruction point) within the volume of sample points based on the selected sample point.

The DDLSR is a modified version of the DLSR; the DLSR uses a single frustum for reprojection, while the DDLSR uses a cube map. The DLSR algorithm is modified to map from a cube map to a frustum, rather than a frustum to a frustum. The cube map can specifically be used to generate a reconstructed 3D virtual scene, for a first stereoscopic view and a second stereoscopic view of a stereoscopic projection of the 3D virtual scene, using the subset of the plurality of sample points. In one embodiment, a single cube map or multiple cube maps are used to generate a first frame buffer for a first stereoscopic view and a second frame buffer for the second stereoscopic view of a stereoscopic. And then, based on the DLSR operations, the cube map image data is adjusted to stereoscopically reconstruct the 3D virtual scene. As such, the DDLSR also supports stereo-correct reconstruction of the virtual scene in that a left view image and a right view image, which are subtly different, are both reconstructed in order to reconstruct a stereoscopic image of a portion of the virtual world. Advantageously, by combining differing perspectives of the environment with a single reprojection, the DDLSR can successfully remove discontinuity artifacts that would otherwise be present.

Figure 2:
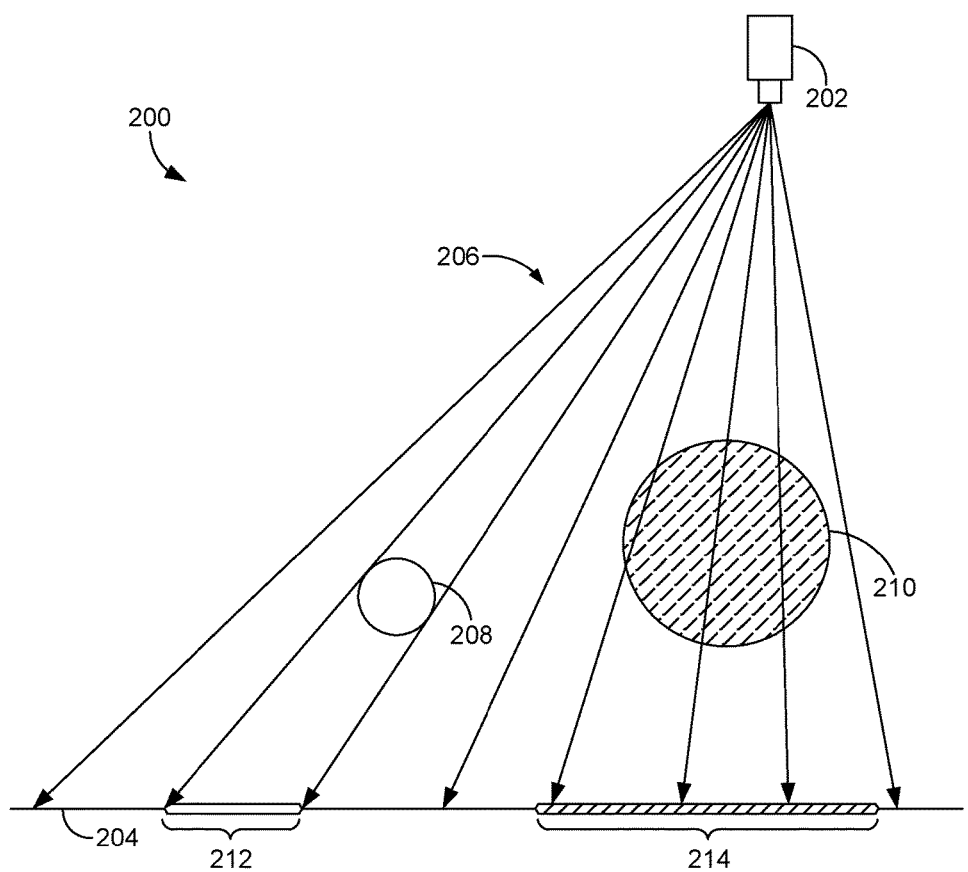
FIG. 2 is an illustration of an exemplary two-dimensional viewing frustum for an HMD, in accordance with embodiments of the present invention.

Turning to FIG. 2, by way of background, image rendering and DLSR examples are described herein in the context of 2D geometry for clarity. In 2D geometry, points in a 2D scene are mapped to one dimension. FIG. 2 schematically illustrates partial rendering of an example 2D scene 200 on a display device, where a portion of a frame buffer 204 is shown as a one-dimensional line, and a portion of a viewing frustum 206 (the field-of-view of camera 202) is represented by a fan of virtual rays. In 3D geometry, the frame buffer would be represented by a 2D plane, while the viewing frustum would be represented by an array of virtual rays. In FIG. 2, only a portion of the viewing frustum is shown for simplicity. 2D object 208 and 2D object 210 are shown as circles, representing examples of 2D objects within the 2D scene 200. The display device may render 2D objects 208 and 210 by coloring the pixels in frame buffer 204 which correspond to 2D objects 208 and 210. These pixels correspond to those that are touched by virtual rays cast from camera 202 and intersect each of 2D objects 208 and 210. For example, if 2D object 208 is a green object, then the GPU renders the pixels in frame buffer portion 212 as green, as virtual rays cast from camera 202 which intersect object 208 touch pixels within frame buffer portion 212. Likewise, if 2D object 210 is a red object, then the display device may render pixels in frame buffer portion 214 as red.

Figure 3:
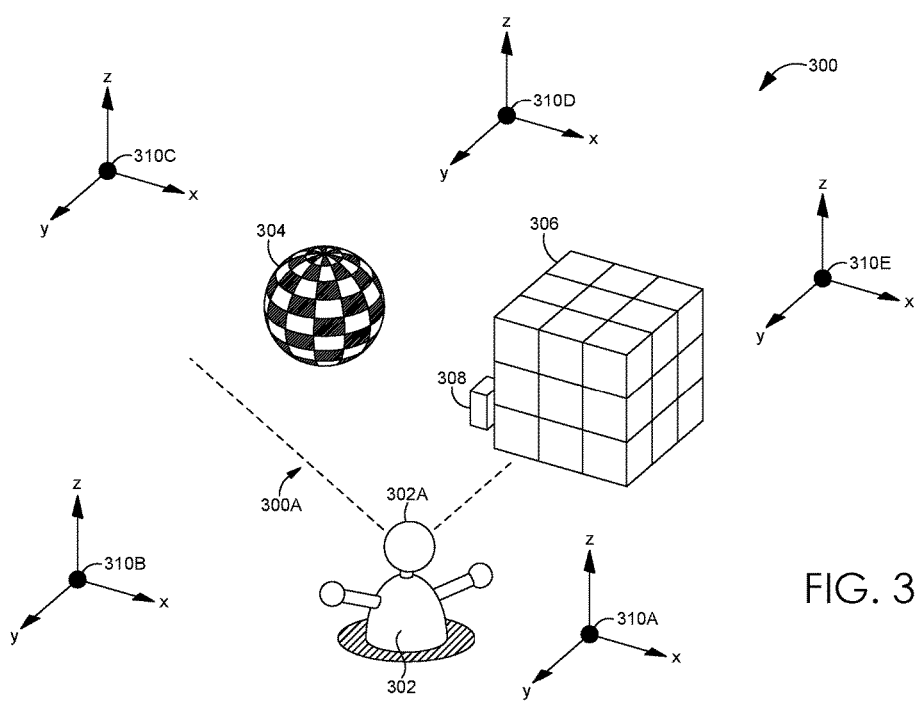
FIG. 3 is an illustration of an exemplary implementation of discontinuity depth late stage reprojection, in accordance with embodiments of the present invention.

FIG. 3 shows an example schematic illustrating an exemplary 3D virtual scene 300, in accordance with embodiments described herein. The 3D virtual scene 300 includes user 302 at a reconstruction point 302A, virtual scene objects (e.g., object 304, object 306 and object 308) and a plurality of sample points (e.g., sample point 310A, sample point 310B, sample point 310C, sample point 310D, and sample point 310E). The user 302 is at the reconstruction point 302A that is associated with a camera pose (e.g., for an HMD) having a reconstruction point view 300A of the 3D virtual scene 300 to be reconstructed from the plurality of sample points. The reconstruction point view 300A can be generated based on a first stereoscopic view and second stereoscopic view. A 3D virtual scene view (i.e., the reconstruction point view 300A) from the reconstruction point can include object 304, object 306, and object 308, when the view is reconstructed.

Reconstructing the 3D virtual scene is based on one or more of the plurality of sample points (e.g., sample point 310A, sample point 310B, sample point 310C, sample point 310D, and sample point 310E). The sample points can be selected in the 3D virtual scene based on a sample point selection scheme. For example, a sample point selection scheme can include selecting more sample points in locations of the 3D virtual scene with more content detail and selecting less sample points in locations of the 3D virtual scene with less content detail. In addition, a distance between a selected sample point and a closest sample point is greater than an intra-ocular distance for stereoscopic reprojection of the reconstructed 3D virtual scene. A sample point includes a cube map of color data and depth data from the sample point in relation to the 3D virtual scene.

A sample point for reconstructing the reconstruction point view 300A can be selected from the plurality of sample points. In an exemplary embodiment, the sample point is a closest sample point relative to the reference point. As shown, sample point 310A is a first closest sample point to the reference point 302A and the sample point 310A is selected to reconstruct the reconstruction point view 300A. The sample point 310 cube map can be used to reconstruct the reconstruct point view 300A based on a first and second stereoscopic view defined using the cube map. In addition, reconstructing the reconstruction point view 300A includes performing a depth-aware cube map late stage projection operation on the sample point 310A to adjust the image data into the reference point 302, as discussed herein in more detail.

Performing the depth-aware cube map late stage projection can identify dis-occlusions that limit reconstructing the reconstruction point view 300A. In particular, in a stereoscopic view, portions of a first view or a second view can be dis-occluded from the sample point 310A, such that, a second sample point is selected to resolve the dis-occlusion. For example, the object 306 can obscure from view, based on the sample point 310A, the object 308. A second sample point, to resolve the dis-occlusion, can be selected based on several different heuristics. As shown, sample point 310B is selected as the second closest sample point to reconstruct the reconstruction point view 300A. The sample point 310B includes a corresponding cube map with color data and depth data at an alternate view of the 3D virtual scene. The alternative view includes image data for portions of the reconstruction point view 300A that are obscured from the sample point 301A. For example, from the sample point 310B object 308 is not obscured. A depth-aware cube map late stage reprojection operation can be performed on the sample point 301B on the sample point 310A to adjust the image data into the reference point 302 and resolve the identified dis-occlusions.

In one embodiment, one or more closest sample points relative to the reconstruction point are identified from the plurality of sample points. A relative convergence score is generated for each of the one or more closest sample points based on the depth-aware cube map late stage projection operation, such that, a subset of the one or more sample points that are selected based on a relative convergence threshold score, are used for reconstruction of the reconstruction point view 300A. Further, in operation, reconstructing the 3D virtual scene can be based on mapping the cube map into a frustum of the reference point view on a per-pix basis while performing the depth-aware cube map late stage projection operation. In particular, for reconstruction of stereoscopic views, the first stereoscopic view is associated with a first original frame buffer and a first reprojected frame buffer based on the cube map color data and depth data of a selected sample point; and the second stereoscopic view is associated with a second original frame buffer and a second reprojected frame buffer based on the cube map color data and depth data of the selected sample point. As such, other variations and combinations of reconstruction techniques based on embodiments described herein are contemplated.

Figure 4:
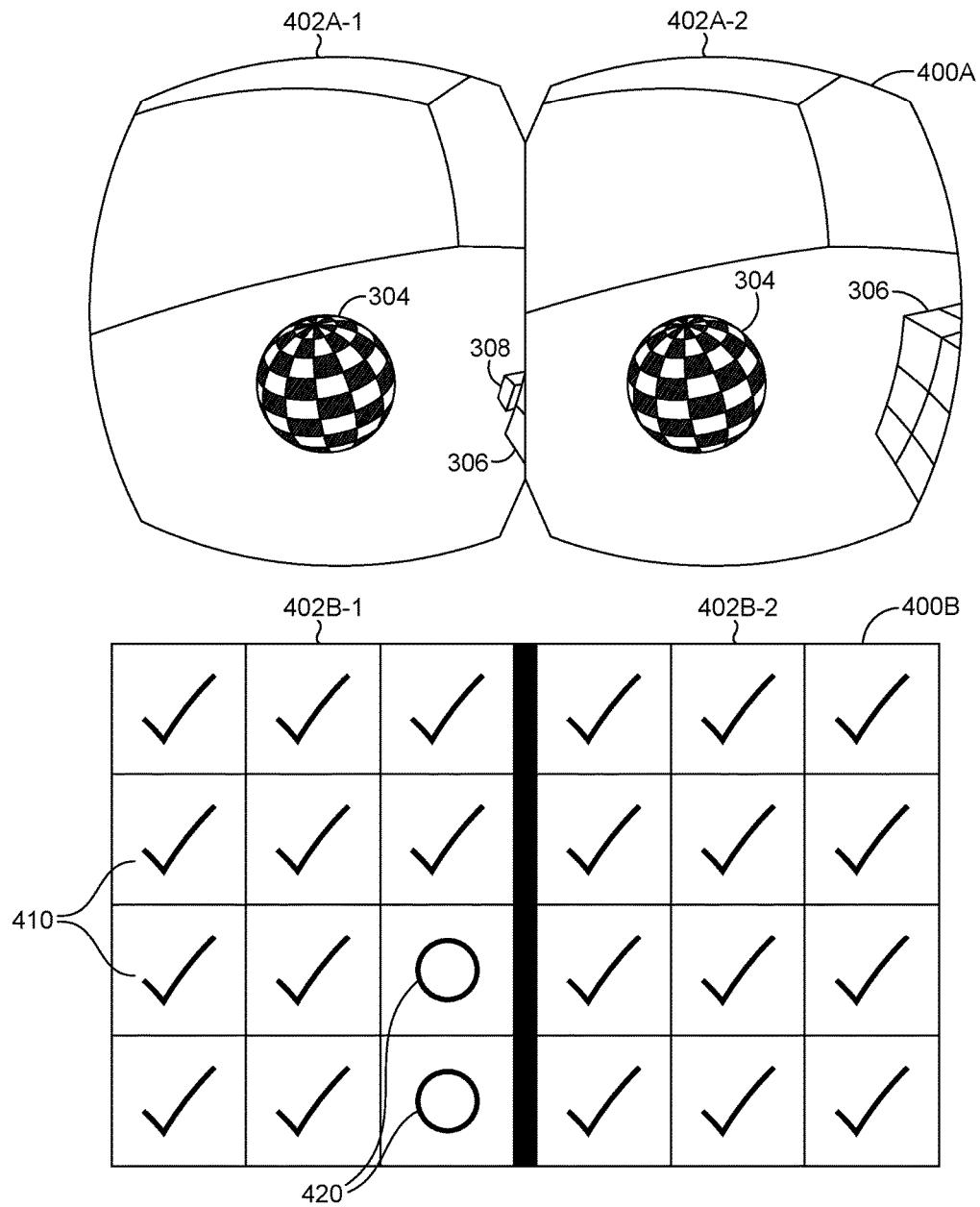
FIG. 4 is an illustration of exemplary implementation of discontinuity depth late stage reprojection, in accordance with embodiments of the present invention.

Turning to FIG. 4, FIG. 4 shows an example schematic illustrating stereoscopic views in accordance with embodiments described herein. View 400A is stereoscopically reconstructed 3D virtual scene corresponding to reconstruction point 302A and reconstruction point of view 300A in FIG. 3. View 400A includes a first stereoscopic view 402A_1 and a second stereoscopic view 402A_2. View 402A_1 includes object 304, object 306 and object 308 and view 402A_2 includes only object 304 and object 308. As discussed, portions of the first stereoscopic view 402A_1 and the second stereoscopic view 402A_2 can be reconstructed based on sample point 310A.

With reference to view 400B, having a first stereoscopic view 402B_1 and second stereoscopic view 402B_2, view 400B is a simplified exemplary per-pixel based reconstruction of the reconstruction point view 300A. The check marks 410 indicate the portions that are reconstructed from sample point 310A and the circles 420 indicate portions (i.e., dis-occlusions) from that could not be reconstructed from the sample point 310A. Upon selecting the second sample point, sample point 310B, the circles 420 indicate reconstructed previously dis-occluded portions from the sample point 320B. Projecting the combination of the first stereoscopic view 402A_1 and the second stereoscopic view 402A_2 provides a representation of a stereo-correct reconstruction of the reconstruction point view 300A of the 3D virtual scene 300.

Figure 5:
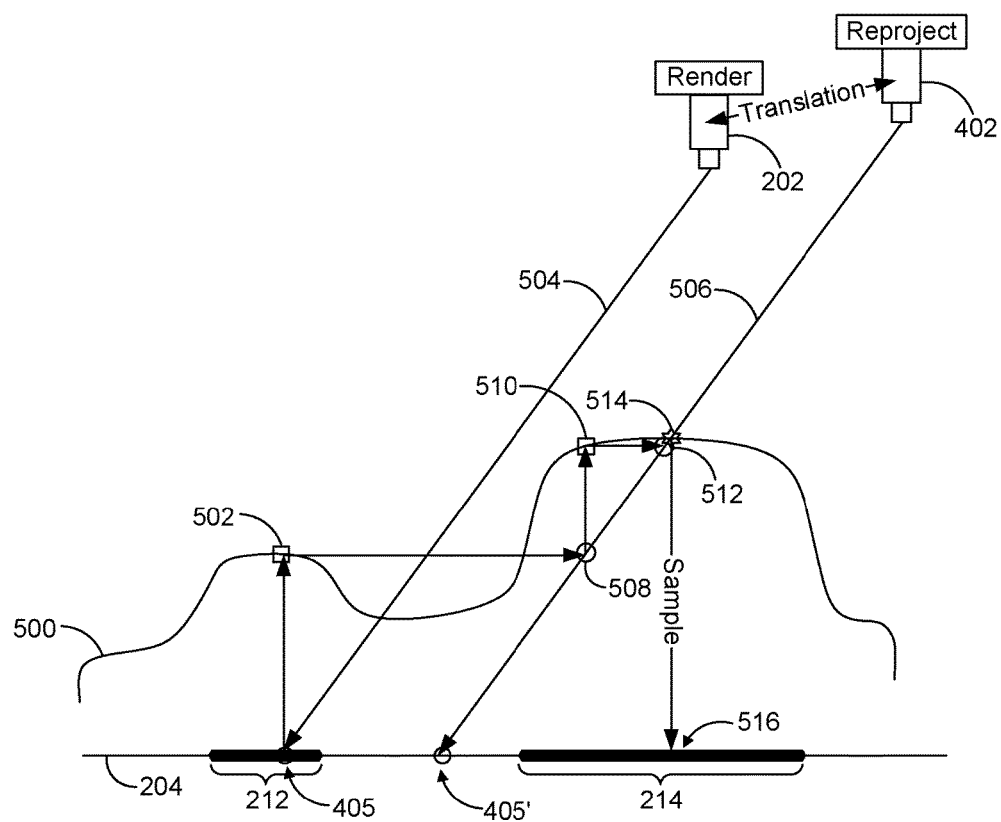
FIG. 5 is an illustration of exemplary successive approximation steps for determining a location and color at a reprojected frame buffer pixel, in accordance with embodiments of the present invention.

FIG. 5 shows a schematic representation of a blurred depth map 500 of 2D scene 200, and illustrates an example method of determining a color to sample for display using blurred depth map 500. Each pixel in frame buffer 204 maps to a corresponding entry in blurred depth map 500. Blurred depth map 500 is depicted as a curved line, where each point on the curved line corresponds to a distance between rendering camera 202 and the nearest 2D object on the ray cast to a corresponding pixel. For example, the square 502 represents the depth value on blurred depth map 500 that corresponds to pixel 405. In addition to blurring, further bounds may be applied on the size of the translation and the distance to the nearest object.

Prior to translational correction, a rotational correction may be applied. This may be visualized by tilting both the curved line (depth map 500) and the straight line (frame buffer 204) relative to rendering camera 202 based on detected rotational changes in the camera position due to head and/or device movement. Because a rotational correction transforms both the depth map and the frame buffer pixel locations equally, the mapping of each pixel to its corresponding depth value is preserved.

In contrast, as described above, translational correction relies on each pixel's depth entry to determine a translated location from which the device should sample values for the outbound frame buffer. Because each blurred depth map entry may correspond to 64 or more pixels, the device interpolates the sampling address based on the pixel address for each pixel. When rendering the original frame buffer, the device relies on the geometry of the 2D scene to determine which 2D object is closest to the rendering camera and thereby contributes the most to the depth value for each pixel. Depth-aware late-stage reprojection performs a similar process, but the depth map is used to infer the color that would have been rendered based on the 2D scene geometry. The GPU or other device performing the reprojection thus determines, for each pixel, where a reprojected ray cast from the rendering camera extending to a reprojected pixel intercepts the depth map.

The location at which reprojected ray 506 intersects blurred depth map 500 may be determined using successive approximation. In FIG. 5, the squares represent depth value estimates while the circles represent locations on the reprojected ray corresponding to depth value estimates. First, an initial depth value 502 is determined which corresponds to the original frame buffer location, illustrated as source pixel 405 along original ray 504. Then, an initial location 508 on reprojected ray 506 is determined that corresponds to initial depth value 502. Next, an updated depth value 510 on blurred depth map 500 is determined which corresponds to initial location 508 on reprojected ray 506. Next, an updated location 512 on reprojected ray 506 is determined that corresponds to updated depth value 510. The steps of determining the updated depth value on blurred depth map 500 and determining the updated location on reprojected ray 506 may be iteratively repeated any suitable number of times. In some examples, these steps are repeated a fixed number of times, such that the iterative process is deterministic.

After a suitable or fixed number of iterative cycles, a location 514 at which reprojected ray 506 intersects blurred depth map 500 is determined. The device then samples frame buffer 500 location that corresponds to location 514, at 516 for display. Convergence to location 514 may occur fairly quickly, at least partially as a result of the blurring of the depth map. Where a fixed number of cycles is used, the number of cycles selected may depend upon how quickly the successive approximation is determined to converge to a suitable accuracy. The use of a deterministic fixed number of iterations may be a programmed parameter, and may provide various advantages. For example, the use of a fixed number of cycles helps to control an amount of processing power used for each reprojected frame of image data, and to maintain a consistent data flow through the graphics processing pipeline. In other implementations, the process may utilize a convergence threshold rather than a fixed number of iterations per pixel.

Figure 6:
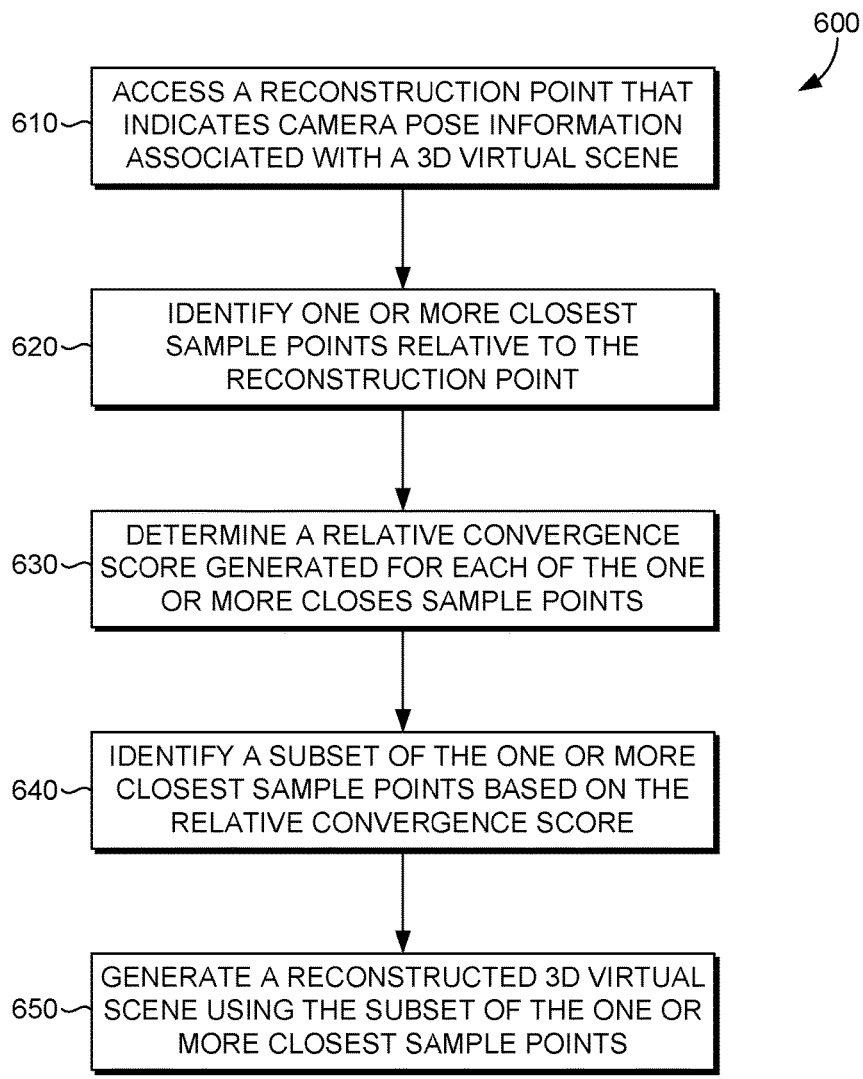
FIG. 6 is a flow diagram showing a method for reprojecting three-dimensional (3D) virtual scenes using discontinuity depth late stage reprojection, in accordance with embodiments of the present invention.

With reference to FIG. 6, a method for reprojecting images using discontinuity depth late stage reprojection, is provided. The method 600 can be performed using a reprojection engine of the display system described herein. Initially at block 610, a reconstruction point, that indicates camera pose information associated with a 3D virtual scene, is accessed. The 3D virtual scene is associated with a plurality of sample points each having a cube map of color data and depth data. Selecting locations for placing the plurality of sample points in the 3D virtual scene is based on a sample point selection scheme that includes selecting more sample points in locations of the 3D virtual scene with more content detail and selecting less sample points in locations of the 3D virtual scene with less content detail. A distance between a selected sample point and a closest sample point is greater than an intra-ocular distance for stereoscopic reprojection of the reconstructed 3D virtual scene. At block 620, one or more closest sample points relative to the reconstruction point, are identified. The one or more closest sample points are identified from the plurality of sample points.

At block 630, a relative convergence score, generated for each of the one or more closest sample points based on performing a depth-aware cube map late stage projection operation for each of the one or more closest sample points in relation to the reconstruction point, is determined. The relative convergence score is an indicator of a capacity of a sample point to reconstruct at least portions of the 3D virtual scene from the reconstruction point.

As discussed, convergence from an original location to a reference point location may be based on a fixed number of cycles is used, the number of cycles selected may depend upon how quickly the successive approximation is determined to converge to a suitably accurate location. The use of a deterministic fixed number of iterations may be a programmed parameter, and may provide various advantages. For example, the use of a fixed number of cycles helps to control an amount of processing power used for each reprojected frame of image data, and to maintain a consistent data flow through the graphics processing pipeline. In other implementations, the process may utilize a convergence threshold rather than a fixed number of iterations per pixel. The number of successive approximation cycles required or the inability to converge can be quantified to define a relative convergence score for a sample point in relation to a reference point. At a high level, the higher the convergence score the higher the likelihood of a sample point to reconstruct a 3D virtual scene or a portion of the 3D virtual scene from the reconstruction point view. At block 640, a subset of the one or more closest sample points is identified, based on eliminating one or more of the one or more closest sample points based on the relative convergence score. At block 650, a reconstructed 3D virtual scene is generated, using the subset of the one or more closest sample points. It is contemplated that generating the reconstructed 3D virtual scene can further include rendering and communicating image data of the reconstructed 3D virtual scene for display via a display of a device (e.g., an HMD).

Figure 7:
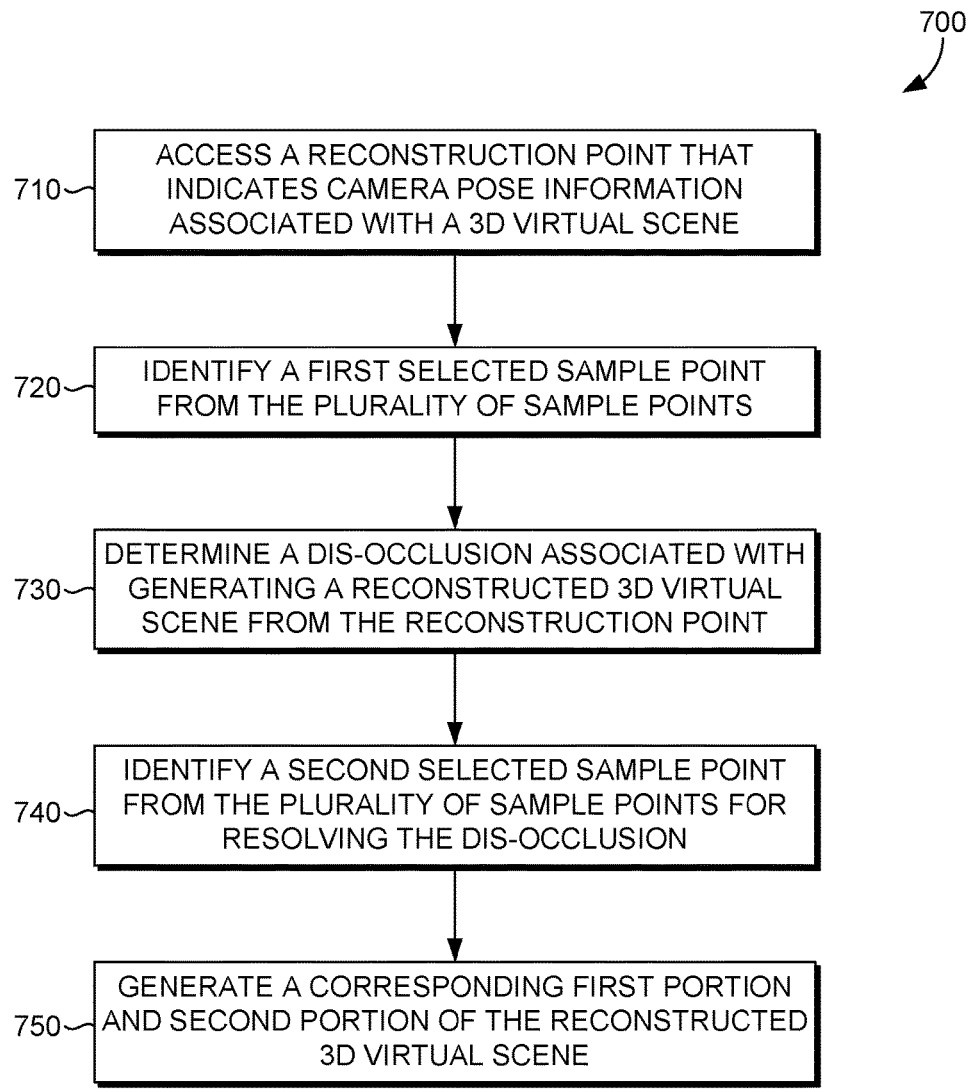
FIG. 7 is a flow diagram showing a method for reprojecting three-dimensional (3D) virtual scenes using discontinuity depth late stage reprojection, in accordance with embodiments of the present invention.

With reference to FIG. 7, a method for reprojecting three-dimensional (3D) virtual scenes using discontinuity depth late stage reprojection is provided. The method 700 can be performed using a reprojection engine of the display system described herein. Initially at block 710, a reconstruction point that indicates camera pose information associated with a 3D virtual scene is accessed. The 3D virtual scene is associated with a plurality of sample points each having a cube map of color data and depth data. At block 720, a first selected sample point from the plurality of sample points is identified. The first selected sample point is a closest sample point relative to the reconstruction point. At block 730, a dis-occlusion associated with generating a reconstructed 3D virtual scene from the reconstruction point, is determined. The dis-occlusion is determined based on performing a depth-aware cube map late stage projection operation for the first selected sample point in relation to reference point.

At block 740, a second selected sample point, from the plurality of sample points, for resolving the dis-occlusion, is identified. The second selected sample point is a second closest sample point relative to the reconstruction point. The second selected sample point can be a second closest sample point relative to the reconstruction point; however, the second selected sample point can also be selected based one or more heuristics defined for selecting the second selected sample point. At block 750, a corresponding first portion and second portion of the reconstructed 3D virtual scene are generated using the first selected sample point and the second selected sample point based on performing the depth-aware cube map late stage projection operation on the first selected sample point and the second selected sample point in relation to the reference point.

The reconstruction point can be associated with a first stereoscopic view and a second stereoscopic view such that generating the reconstructed 3D virtual scene includes generating the first stereoscopic view and the second stereoscopic view. The first stereoscopic view is associated with a first original frame buffer and a first reprojected frame buffer based on a cube map color data and depth data of a selected sample point; and the second stereoscopic view is associated with a second original frame buffer and a second reprojected frame buffer based on the cube map color data and depth data of the selected sample point.

Figure 8A:
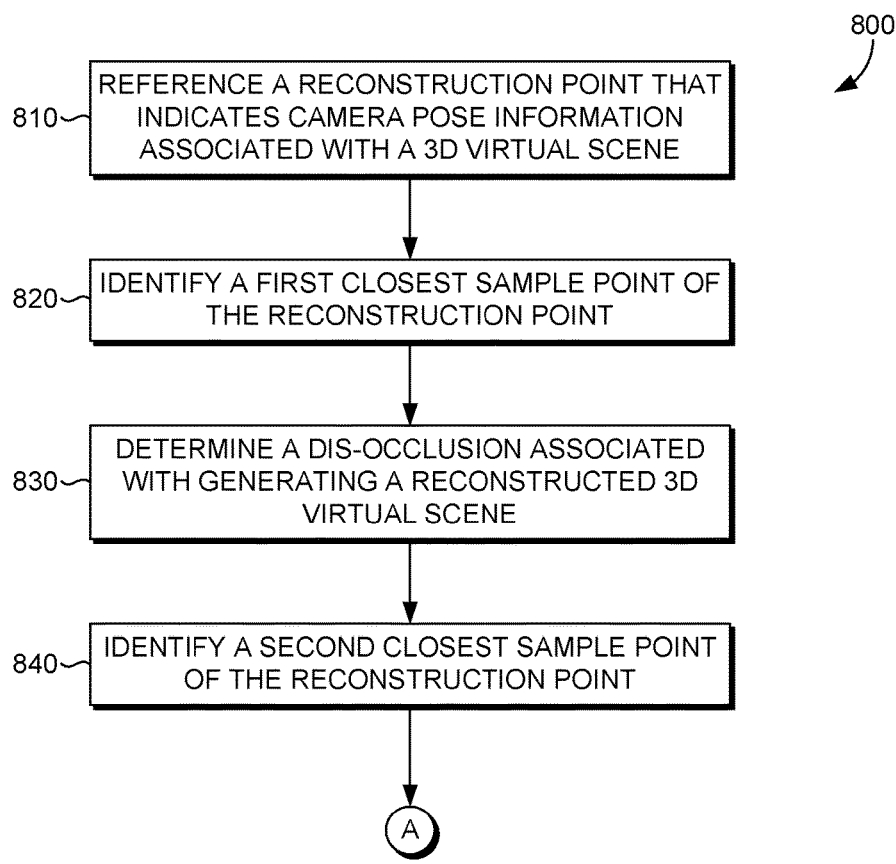
FIGS. 8A and 8B are a flow diagram showing a method for reprojecting three-dimensional (3D) virtual scenes using discontinuity depth late stage reprojection, in accordance with embodiments of the present invention.
Figure 8B:
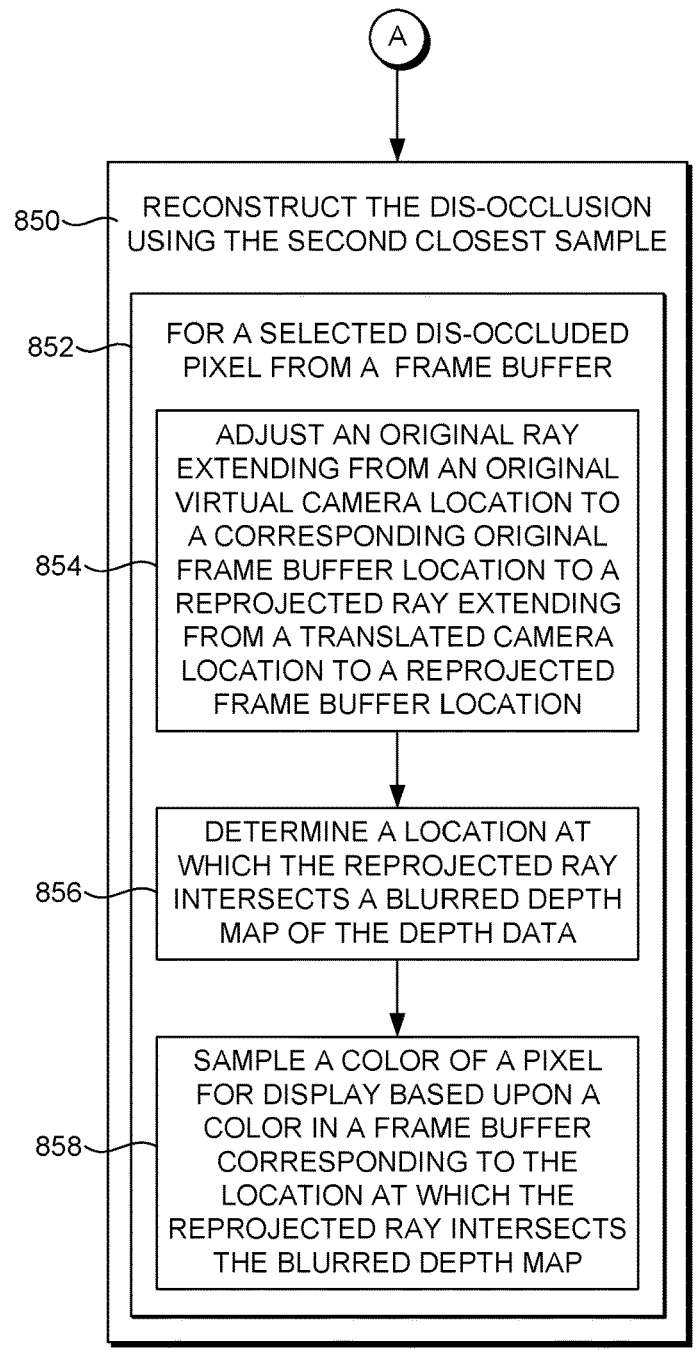

With reference to FIGS. 8A and 8B, a method for reprojecting images, using discontinuity depth late stage reprojection, is provided. The method 800 can be performed using the reprojection engine of the display system described herein. A computer storage medium can include computer-executable instructions that when executed by a processor causes the processor to perform the method 800. Initially at block 810, a reconstruction point that indicates camera pose information associated with a 3D virtual scene is referenced. The reconstruction point is associated with a cube map of color data and depth data of the 3D virtual scene, the reconstruction point is selected from a plurality of sample points of the 3D virtual scene. At block 820, a first closest sample point of the reconstruction point, the first closest sample point is selected from the plurality of sample points.

At block 830, a dis-occlusion, associated with generating a reconstructed 3D virtual scene from the reconstruction point, is determined. The dis-occlusion is determined based on performing a depth-aware cube map late stage projection operation for first closest sample point in relation to reference point. The dis-occlusion is associated with one of a first stereoscopic view or a second stereoscopic view of the reconstruction point. At block 840, a second closest sample point of the reconstruction point is identified. The second closest sample point is selected from the plurality of sample points.

At block 850, the dis-occlusion is reconstructed using the second sample point based on performing a depth-aware cube map late stage projection process based on the second closest sample point in relation to the reference point. In one exemplary implementation, at block 852, for a selected dis-occluded pixel from a frame buffer, at block 854, an original ray, extending from an original virtual camera location associated with a selected sample point to a corresponding original frame buffer location, is adjusted. The original ray is adjusted to a reprojected ray extending from a translated camera location associated with the reconstruction point to a reprojected frame buffer location. At block 856, a location at which the reprojected ray intersects the depth data comprising a blurred depth map is determined. Determine the location at which the reprojected ray intersects the blurred depth map is based on iteratively repeating determining of updated depth values and determining of updated locations on the reprojected ray. At block 856, a color of a pixel for display, is sampled. The color is sampled based upon a color in a frame buffer corresponding to the location at which the reprojected ray intersects the blurred depth map.

By way of background, an exemplary device display that can support discontinuity-aware reprojection is an augmented reality device. An augmented reality device can support the presentation of augmented reality images. Augmented reality images include augmented reality objects, which are virtualized objects or entities (e.g., holographic content or mixed-reality content), that are rendered for a user associated with the augmented reality device. As used herein, augmented reality is a type of virtual reality and embodiments described herein are contemplated for implementation in virtual reality or augmented reality. In particular, the augmented reality objects can be rendered based on a real world environment, where the real world environment can be captured in a digital representation by the augmented reality device. Understanding the real world environment can be based on several different techniques that provide the augmented reality device with information about the environment. For example, an environment can be scanned in real-time and a mesh representation of the environment can be dynamically generated to provide the augmented reality device with information about the environment.

As such, augmented reality devices can support augmented reality or mixed-reality experiences. Such experiences include navigating through real world environments based on augmented reality objects or viewing augmented reality objects ("AR objects") in combination with the real world environment. AR objects can include a hologram catalogue of 3D objects or virtual images that can be placed and scaled around a user. AR objects can be used in a variety of different implementations (e.g., video games, entertainment, productivity tools, etc.) as entities that can be controlled through a graphical user interface from actuators from the user via the mixed-input pointing device described herein.

With reference to FIG. 1, exemplary images of a head-mounted display (HMD) device 102 are depicted. Augmented reality images (e.g., 104A, 104B and 104C), comprising corresponding virtual images provided by the HMD 102 device, generally include the virtual images that appear superimposed on a background 106 and may appear to interact with or be integral with the background 106. The background 106 is comprised of a real-world scene, e.g., a scene that a user would perceive without an augmented reality image emitted by the HMD 102 device. For example, an augmented reality image can include the recipe book icon 104C that appears superimposed and hanging in mid-air in front of the cooking oven or wall of the background 106. Then, as the user moves within the room, image data and/or other motion data (e.g. inertial measurement unit (IMU) data) may be used to update the orientation of the device and sensors, lasers or other positioning track systems may be used to update the position of the device with respect to the augment reality images objects 104A, 104B and 104C, and thereby update the displayed position of virtual objects 104A, 104B and 104C as appropriate.

With reference to the display system 900, embodiments described herein support reprojecting images based on discontinuity depth late stage projection. The display system components refer to integrated components for reprojecting images. The integrated components refer to the hardware architecture and software framework that support data access functionality using the display system. The hardware architecture refers to physical components and interrelationships thereof and the software framework refers to software providing functionality that can be implemented with hardware embodied on a device. The end-to-end software-based display system can operate within the display system components to operate computer hardware to provide display system functionality. As such, the display system components can manage resources and provide services for the display system functionality. Any other variations and combinations thereof are contemplated with embodiments of the present invention.

By way of example, the display system can include an API library that includes specifications for routines, data structures, object classes, and variables may support the interaction between the hardware architecture of the device and the software framework of the display system. These APIs include configuration specifications for the display system such that the different components therein can communicate with each other in the display system, as described herein.

Turning to FIG. 9, the display system 900 includes the HMD device 902 having the reprojection engine 940 described in accordance with an embodiment described herein. The HMD device 902 includes a see-through lens 910 which is placed in front of a user's eye 914, similar to an eyeglass lens. It is contemplated that a pair of see-through lenses 910 can be provided, one for each eye 914. The lens 910 includes an optical display component 928, such as a beam splitter (e.g., a half-silvered mirror). The HMD device 902 includes an augmented reality emitter 930 that facilitates projecting or rendering the of augmented reality images. Amongst other components not shown, the HMD device also includes a processor 942, memory 944, interface 946, a bus 948, and additional HMD components 950. The augmented reality emitter 930 emits light representing a virtual image 902 exemplified by a light ray 908. Light from the real-world scene 904, such as a light ray 906, reaches the see-through lenses 910. Additional optics can be used to refocus the virtual image 902 so that it appears to originate from several feet away from the eye 914 rather than one inch away, where the display component 928 actually is. The memory 944 can contain instructions which are executed by the processor 942 to enable the augmented reality emitter 930 to perform functions as described. One or more of the processors can be considered to be control circuits. The augmented reality emitter communicates with the additional HMD components 950 using the bus 948 and other suitable communication paths.

Light ray representing the virtual image 902 is reflected by the display component 928 toward a user's eye, as exemplified by a light ray 910, so that the user sees an image 912. In the augmented-reality image 912, a portion of the real-world scene 904, such as, a cooking oven is visible along with the entire virtual image 902 such as a recipe book icon. The user can therefore see a mixed-reality or augmented-reality image 912 in which the recipe book icon is hanging in front of the cooking oven in this example.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Embodiments of the present disclosure can be discussed with reference to an exemplary display system 900 in which implementations of the present disclosure may be employed. FIG. 9 shows a high level architecture of the display system 900 having an infrastructure and communicating using components in accordance with implementations of the present disclosure. The display system 900 specifically includes the reprojection engine 940. A system as used herein refers to any device, process, or service or combination thereof. A system may be implemented using components as hardware, software, firmware, a special-purpose device, or any combination thereof. A system may be integrated into a single device or it may be distributed over multiple devices. The various components of a system may be co-located or distributed. The system may be formed from other system and components thereof. The components of the thumbnail object generation system facilitate generating thumbnail object based on thumbnail anchor points.

Having identified various components of the display system 900, it is noted that any number of components may be employed to achieve the desired functionality within the scope of the present disclosure. The various components of FIG. 9 are shown with lines for the sake of clarity. Further, although some components of FIG. 9 are depicted as single components, the depictions are exemplary in nature and in number and are not to be construed as limiting for all implementations of the present disclosure. The display system 900 functionality can be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 10:
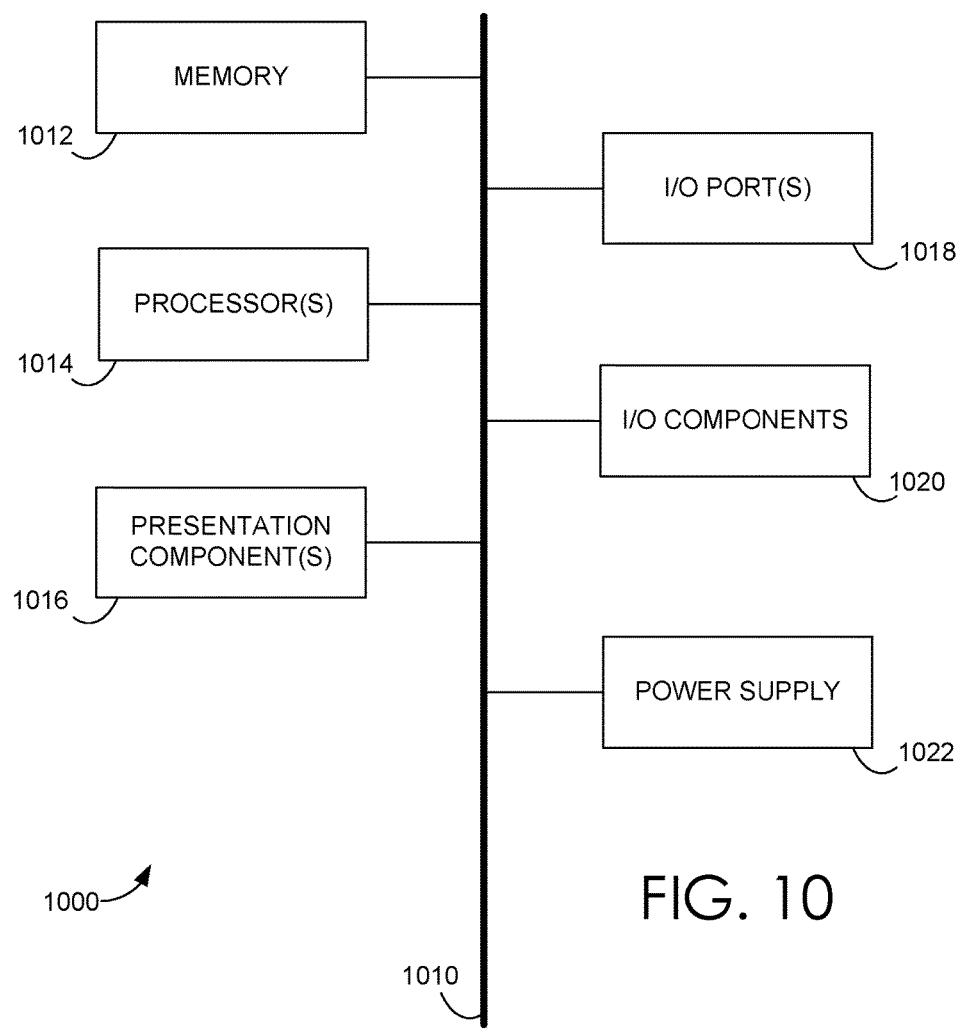
FIG. 10 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 10 in particular, an exemplary operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output ports 1018, input/output components 1020, and an illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 10 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the display system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for reprojecting three-dimensional (3D) virtual scenes using discontinuity depth late stage reprojection, the system comprising:
   one or more processors and memory configured for providing computer program instructions to the one or more processors;
   a reprojection engine configured to:
   access a reconstruction point that indicates camera pose information associated with a 3D virtual scene, the 3D virtual scene is associated with a plurality of sample points each having a cube map of color data and depth data;
   identify one or more closest sample points relative to the reconstruction point, the one or more closest sample points is identified from the plurality of sample points;
   determine a relative convergence score generated for each of the one or more closest sample points based on performing a depth-aware cube map late stage projection operation for each of the one or more closest sample points in relation to the reconstruction point, wherein the relative convergence score is an indicator of a capacity of a sample point to reconstruct at least portions of the 3D virtual scene from the reconstruction point;
   identifying a subset of the one or more closest sample points based on eliminating one or more of the one or more closest sample points based on the relative convergence score; and
   generating a reconstructed 3D virtual scene using the subset of the one or more closest sample points.

2. The system of claim 1, wherein the reprojection engine is further configured to perform the depth-aware cube map late stage projection operation based on:
   adjusting an original ray extending from an original virtual camera location associated with a selected sample point to a corresponding original frame buffer location to a reprojected ray extending from a translated camera location associated with the reconstruction point to a reprojected frame buffer location; and determining a location at which the reprojected ray intersects the depth data comprising a blurred depth map.

3. The system of claim 2, wherein the reprojection engine is further configured to determine the location at which the reprojected ray intersects the blurred depth map by iteratively repeating determining of updated depth values and determining of updated locations on the reprojected ray; and
sample a color of a pixel for display based upon a color in a frame buffer corresponding to the location at which the reprojected ray intersects the blurred depth map.

4. The system of claim 2, wherein the reprojection engine is further configured to generate the original frame buffer and the reprojected frame buffer based on the cube map color data and depth data.

5. The system of claim 1, wherein the reprojection engine is further configured to generate the reconstructed 3D virtual scene using a first stereoscopic view and a second stereoscopic view of a stereoscopic projection of the 3D virtual scene from the reconstruction point, using the subset of the plurality of sample points.

6. The system of claim 1, wherein selecting locations for plurality of sample points in the 3D virtual scene is based on a sample point selection scheme that includes selecting more sample points in locations of the 3D virtual scene with more content detail and selecting less sample points in locations of the 3D virtual scene with less content detail.

7. The system of claim 6, wherein a distance between a selected sample point and a closest sample point is greater than an intra-ocular distance for stereoscopic reprojection of the reconstructed 3D virtual scene.

8. A computer-implemented method for reprojecting three-dimensional (3D) virtual scenes using discontinuity depth late stage reprojection, the method comprising:
accessing a reconstruction point that indicates camera pose information associated with a 3D virtual scene, the 3D virtual scene is associated with a plurality of sample points each having a cube map of color data and depth data;
identifying a first selected sample point from the plurality of sample points, wherein the first selected sample point is a closest sample point relative to the reconstruction point;
determining a dis-occlusion associated with generating a reconstructed 3D virtual scene from the reconstruction point, wherein the dis-occlusion is determined based on performing a depth-aware cube map late stage projection operation for first selected sample point in relation to reference point;
identifying a second selected sample point, from the plurality of sample points, for resolving the dis-occlusion, wherein the second selected sample point is a second closest sample point relative to the reconstruction point; and
generating a corresponding first portion and second portion of the reconstructed 3D virtual scene using the first selected sample point and the second selected sample point based on performing the depth-aware cube map late stage projection operation on the first selected sample point and the second selected sample point in relation to the reference point.

9. The method of claim 8, wherein performing a depth-aware cube map late stage projection operation on a selected sample point is based on:
adjusting an original ray extending from an original virtual camera location associated with a selected sample point to a corresponding original frame buffer location to a reprojected ray extending from a translated camera location associated with the reconstruction point to a reprojected frame buffer location; and
determining a location at which the reprojected ray intersects the depth data comprising a blurred depth map.

10. The method of claim 9, wherein determining the location at which the reprojected ray intersects the blurred depth map is based on iteratively repeating determining of updated depth values and determining of updated locations on the reprojected ray.

11. The method of claim 10, further comprising sampling a color of a pixel for display based upon a color in a frame buffer corresponding to the location at which the reprojected ray intersects the blurred depth map.

12. The method of claim 8, wherein the reconstruction point is associated with a first stereoscopic view and a second stereoscopic view such that generating the reconstructed 3D virtual scene further comprises generating the first stereoscopic view and the second stereoscopic view.

13. The method of claim 12, wherein the first stereoscopic view is associated with a first original frame buffer and a first reprojected frame buffer based on a cube map color data and depth data of a selected sample point; and wherein the second stereoscopic view is associated with a second original frame buffer and a second reprojected frame buffer based on the cube map color data and depth data of the selected sample point.

14. The method of claim 8, wherein a distance between the reconstruction point and the selected sample point is greater than an intra-ocular distance for stereoscopic reprojection of the reconstructed 3D virtual scene.

15. One or more computer storage media having computer-executable instructions embodied thereon that, when executed, by one or more processors, causes the one or more processors to perform a method for reprojecting images based on three-dimensional (3D) virtual images using discontinuity and depth late stage reprojection, the method comprising:
referencing a reconstruction point that indicates camera pose information associated with a 3D virtual scene, the 3D virtual scene is associated with a plurality of sample points each having a cube map of color data and depth data;
identifying a first closest sample point of the reconstruction point, the first closest sample point is selected from the plurality of sample points;
determining a dis-occlusion associated with generating a reconstructed 3D virtual scene from the reconstruction point, wherein the dis-occlusion is determined based on performing a depth-aware cube map late stage projection operation for first closest sample point in relation to reference point, wherein the dis-occlusion is associated with one of a first stereoscopic view or a second stereoscopic view of the reconstruction point;
identifying a second closest sample point of the reconstruction point, the second closest sample point is selected from the plurality of sample points; and
reconstructing the dis-occlusion using the second closest sample point based on performing a depth-aware cube map late stage projection process based on the second closest sample point in relation to the reference point.

16. The media of claim 15, wherein performing a depth-aware cube map late stage projection operation on the selected sample point is based on:
adjusting an original ray extending from an original virtual camera location associated with a selected sample point to a corresponding original frame buffer location to a reprojected ray extending from a translated camera location associated with the reconstruction point to a reprojected frame buffer location; and determining a location at which the reprojected ray intersects the depth data comprising a blurred depth map.

17. The media of claim 15, wherein determining the location at which the reprojected ray intersects the blurred depth map is based on iteratively repeating determining of updated depth values and determining of updated locations on the reprojected ray.

18. The media of claim 17, further comprising sampling a color of a pixel for display based upon a color in a frame buffer corresponding to the location at which the reprojected ray intersects the blurred depth map.

19. The media of claim 15, further comprising generating the reconstructed 3D virtual scene using the first closest sample point and the second closest sample point based on performing the depth-aware cube map late stage projection operation on the first selected sample point and the second selected sample point in relation to the reference point.

20. The media of claim 15, wherein determining the dis-occlusion is based on the depth-aware cube map late stage reprojection operation failure to converge to a corresponding location of the reference point relative to the first closest sample point.

* * * * *